July 24, 1962     H. MEIENBERG     3,045,969
VIBRATION DAMPING DEVICE FOR TURBO-MACHINE
Filed Sept. 11, 1959     2 Sheets-Sheet 1

INVENTOR.
Hans Meienberg
BY Dodge and Sons
Attorneys

July 24, 1962 H. MEIENBERG 3,045,969
VIBRATION DAMPING DEVICE FOR TURBO-MACHINE
Filed Sept. 11, 1959 2 Sheets-Sheet 2

INVENTOR.
HANS MEIENBERG
BY Dodge and Sons
ATTORNEYS

United States Patent Office 3,045,969
Patented July 24, 1962

3,045,969
VIBRATION DAMPING DEVICE FOR TURBO-MACHINE
Hans Meienberg, Zurich, Switzerland, assignor to Escher Wyss Aktiengesellschaft, Zurich, Switzerland, a corporation of Switzerland
Filed Sept. 11, 1959, Ser. No. 839,518
Claims priority, application Switzerland Sept. 26, 1958
4 Claims. (Cl. 253—78)

It is well known that in turbo-machines, more particularly gas and steam turbines and compressors of the axial flow type, the guide and rotor blades may be subject to harmful vibrations, when their natural frequency comes into resonance with an interfering frequency. These are generally vibrations of a relatively high frequency. The exciting forces are generally those which fluctuate with a frequency equal to, or a multiple of, the speed of rotation of the machine.

It is not always possible by appropriate choice of the profiles of the guide or rotor blades or their number to prevent their coming into resonance with an interfering frequency, especially if the speed of the machine in operation is very variable, for example in the ratio of 1:2. The choice of the profile thickness or blade numbers is limited in view of the flow. One has therefore had to be content, by the incorporation of so-called damping wires, to damp the vibrations occurring on resonance to such an extent that they are unable to assume a harmful magnitude. These wires have been either connected rigidly to each blade, or drawn loosely through openings in the blade. In the first case, in addition to damping, the wires produce a certain stiffening of the blade pack. Heretofore, such wires have been arranged on circles concentric with the machine axis. They affect the adjacent blades in the same way, therefore, so that even when the latter are connected together by the wires, they are often not prevented from vibrating to the degree desired.

By means of the device according to the invention, a still better damping of vibrations is now obtained by the fact that at least two blades are rigidly connected together at different distances from the machine axis by a stiffening and damping band traversing the flow channel between the blades.

By this step, the adjacent blades are subdivided into sections having different natural frequencies. Vibration of these sections in common under the influence of a definite interfering frequency, is only possible with relatively considerable deformation of the stiffening band and with the transmission of forces from one blade to the other. The vibrations, therefore, will be correspondingly strongly damped.

The drawing shows a constructional example of the subject of the invention in simplified form.

In the drawing:
FIGURE 1 shows a portion of a guide blade apparatus of an axial compressor stage with a damping and stiffening band according to the invention.

Figure 1:
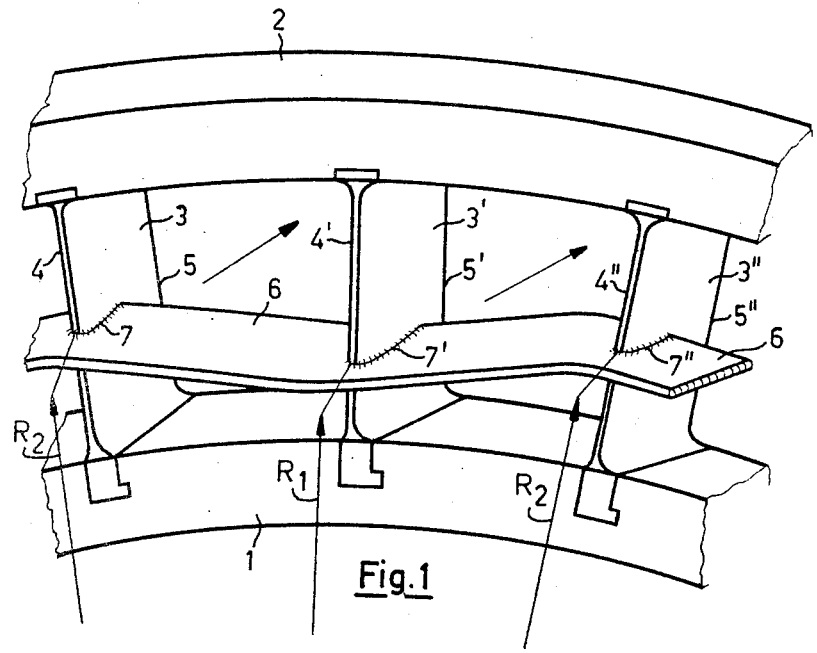

In the guide blade apparatus according to FIGURE 1, guide blades are inserted between an inner ring 1 and an outer ring 2, three adjacent blades, denoted by 3, 3′ and 3″, being shown in the figure. The working medium flows through the guide blading in the direction of the arrows. At 4, 4′, 4″ are shown the inlet edges of the guide blades 3, 3′, 3″ and at 5, 5′, 5″ the outlet edges.

The blades, 3, 3′ and 3″ are connected rigidly together by a stiffening and damping band 6. This traverses the flow channels between the blades, 3, 3′ and 3′, 3″. The stiffening and damping band 6 is inserted into the flow channels from the inlet side. It has slots 7, 7′, 7″, which are engaged by the blade profiles, and at the edges of which the blades 3, 3′, 3″ are rigidly connected to the band 6 by welding.

The band 6 is fixed to the adjacent blades 3 and 3′ at different distances from the machine axis. In the case of the blade 3, the fixing place is situated on a circle concentric with the machine axis and having the radius $R_2$; in the case of the blade 3′, however, on a circle with a smaller radius $R_1$. In the case of the next blade 3″, the fixing place again lies on a circle of radius $R_2$.

Figure 2:
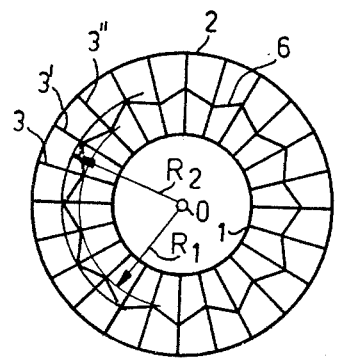
FIGURES 2 and 3 show a diagrammatical representation of two possible arrangements of the damping and stiffening band over the entire circumference of the guide blading.

This can be carried further so that the stiffening band 6 is undulatory and is fixed to successive blades in the peripheral direction alternately at places situated on a circle of radius $R_2$, that is to say farther from the machine axis, and on a circle of radius $R_1$, that is to say nearer to the machine axis than the mean distance $(R_1+R_2)/2$ of the fixing places from the axis. Such an arrangement is shown diagrammatically in FIGURE 2.

Figure 3:
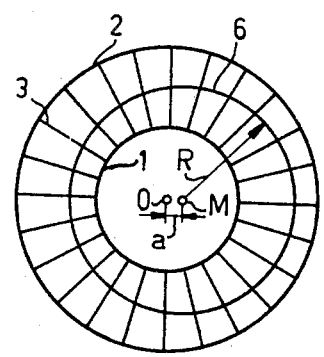

According to FIGURE 3, on the contrary, all the fixing places of the band 6 lie on a circle of radius R. In this case, however, an unequal distance of the fixing places of adjacent blades from the machine axis is obtained by the fact that the centre M of the said circle lies eccentrically from the machine axis O by the amount $a$. The band 6 itself then extends along a cylindrical surface of radius R situated eccentrically with reference to the machine axis.

Figure 4:
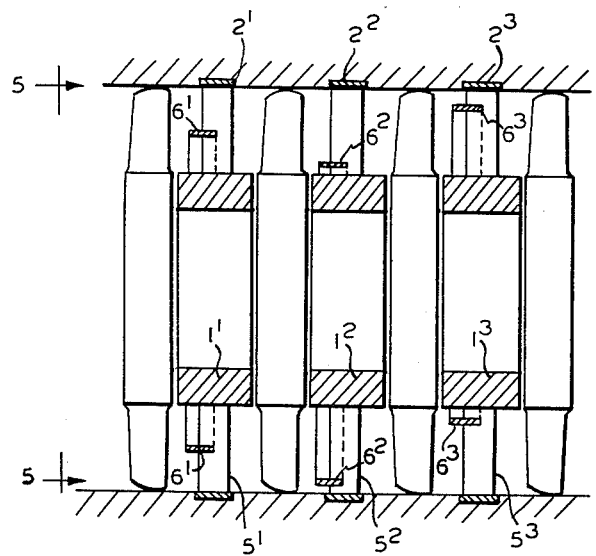
FIGURE 4 is an axial sectional view, in diagrammatic form, of a portion of a multi-stage axial flow turbo-machine incorporating the invention.
Figure 5:
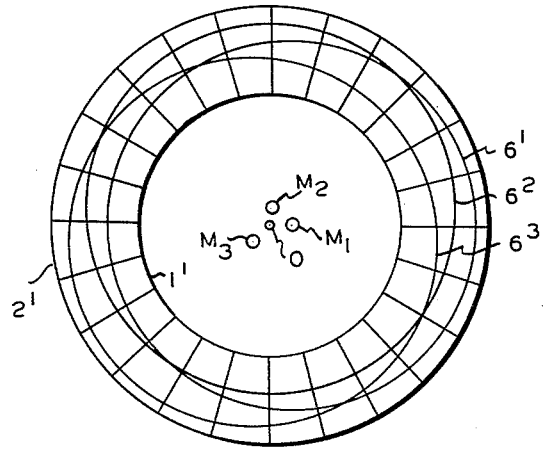
FIGURE 5 is a diagrammatic view taken on line 5—5 of FIG. 4 showing the orientation of the stiffening and damping bands in the three stages.

FIGS. 4 and 5 illustrate a multi-stage machine provided with stiffening and damping bands of the type shown in FIG. 3. In this case, the machine includes three sets of stationary guide blade apparatus comprising inner rings $1^1$, $1^2$ and $1^3$, outer rings $2^1$, $2^2$, and $2^3$, and blades $5^1$, $5^2$ and $5^3$. The stiffening and damping bands $6^1$, $6^2$ and $6^3$ are circular rings centered, respectively, at $M_1$, $M_2$ and $M_3$. It can be seen in FIG. 5 that these centers are eccentric in different directions with respect to the axis O of the machine.

What is claimed is:
1. A stationary guide blade apparatus of an axial flow turbo-machine comprising
(a) an annular blade carrier;
(b) a large number of circumferentially spaced radially extending blades mounted on the carrier and each having a leading edge and a trailing edge;
(c) a continuous endless stiffening and damping band extending circumferentially of the blades and containing slots which fit the blade profiles; and
(d) means rigidly connecting the leading edges of the blades with the band at the edges of said slots,
(e) the band connections on adjacent blades being at different radii from the axis of the machine whereby adjacent blades are divided by the band into sections having different natural frequencies.
2. The apparatus defined in claim 1 in which the band connections are located at only two different radii from the axis of the machine.
3. The apparatus defined in claim 1 in which the band, in transverse cross-section, is a circular ring centered eccentrically with respect to the axis of the machine.
4. A multi-stage axial flow turbo-machine in which each stage includes a stationary guide blade apparatus which comprises
(a) an annular blade carrier;

(b) a large number of circumferentially spaced radially extending blades mounted on the carrier and each having a leading edge and a trailing edge;

(c) a continuous endless stiffening and damping band extending circumferentially of the blades and containing slots which fit the blade profiles;

(d) the band, in transverse cross-section, being a circular ring centered eccentrically with respect to the axis of the machine, the direction of eccentricity being different in each stage; and (e) means rigidly connecting the leading edges of the blades with the band at the edges of said slots, (f) whereby the band connections on adjacent blades are at different radii from the axis of the machine and adjacent blades are divided by the band into sections having different natural frequencies.

References Cited in the file of this patent

UNITED STATES PATENTS

| | | |
|---|---|---|
| 791,744 | Arnold | June 6, 1905 |
| 1,068,512 | Ljungstrom | July 29, 1913 |
| 1,544,318 | Hodgkinson | June 30, 1925 |
| 1,888,795 | Faber | Nov. 22, 1932 |
| 2,169,233 | Ponomareff | Aug. 15, 1939 |
| 2,317,502 | Upson | Apr. 27, 1943 |
| 2,399,009 | Doran | Apr. 23, 1946 |

FOREIGN PATENTS

| | | |
|---|---|---|
| 1,566 | Australia | Apr. 24, 1926 |
| 38,691 | Sweden | Mar. 16, 1914 |
| 315,722 | Great Britain | Feb. 27, 1930 |
| 531,364 | Germany | Aug. 8, 1931 |
| 728,116 | Germany | Oct. 15, 1942 |